(12) United States Patent
Upadhya et al.

(10) Patent No.: US 10,938,623 B2
(45) Date of Patent: Mar. 2, 2021

(54) COMPUTING ELEMENT FAILURE IDENTIFICATION MECHANISM

(71) Applicant: Hewlett Packard Enterprise Development LP, Houston, TX (US)

(72) Inventors: Pavan Belur Gopalakrishna Upadhya, Bangalore Karnataka (IN); Vinay Sahadevappa Banakar, Bangalore Karnataka (IN); Maneesh Keshavan Bendiganavale, Bangalore Karnataka (IN); Naveena Kedlaya, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 82 days.

(21) Appl. No.: 16/168,821

(22) Filed: Oct. 23, 2018

(65) Prior Publication Data
US 2020/0127882 A1 Apr. 23, 2020

(51) Int. Cl.
| | | |
|---|---|---|
| G06F 11/00 | (2006.01) | |
| H04L 12/24 | (2006.01) | |
| G06F 11/07 | (2006.01) | |
| G06Q 10/06 | (2012.01) | |
| G06N 5/02 | (2006.01) | |
| G06N 20/00 | (2019.01) | |

(52) U.S. Cl.
CPC ......... *H04L 41/065* (2013.01); *G06F 11/079* (2013.01); *G06F 11/0709* (2013.01); *G06N 5/02* (2013.01); *G06N 20/00* (2019.01); *G06Q 10/0635* (2013.01); *H04L 41/0677* (2013.01); *H04L 41/12* (2013.01); *H04L 41/14* (2013.01); *H04L 41/16* (2013.01)

(58) Field of Classification Search
CPC .. G06F 11/0709; G06F 11/076; G06F 11/079; H04L 41/065
See application file for complete search history.

(56) References Cited

U.S. PATENT DOCUMENTS

| | | | |
|---|---|---|---|
| 8,015,139 B2 * | 9/2011 | Bahl | G06N 5/043 706/46 |
| 9,122,602 B1 * | 9/2015 | Jewell | G06F 11/079 |
| 9,537,720 B1 * | 1/2017 | Baggott | H04L 41/12 |
| 9,569,298 B2 | 2/2017 | Hampapur et al. | |

(Continued)

FOREIGN PATENT DOCUMENTS

KR 101856543 5/2018

OTHER PUBLICATIONS

Guan, Q. et al.; "A Failure Detection and Prediction Mechanism for Enhancing Dependability of Data Centers"; Oct. 2012; 5 pages.

(Continued)

*Primary Examiner* — Elmira Mehrmanesh
(74) *Attorney, Agent, or Firm* — Hewlett Packard Enterprise Patent Department

(57) ABSTRACT

In an example, a first graph representing a first set of combinations of computing elements and logical elements used in a computing environment is compared with a second set of combinations of computing elements and logical elements. The first set of combinations includes a plurality of element combinations. The comparison may be performed to identify a potentially faulty element combination among the first set of combinations.

20 Claims, 7 Drawing Sheets

(56) References Cited

U.S. PATENT DOCUMENTS

| | | | | |
|---|---|---|---|---|
| 9,898,357 | B1* | 2/2018 | Viswanathan | G06F 11/079 |
| 10,373,094 | B2* | 8/2019 | Naous | G06Q 10/067 |
| 2003/0046390 | A1* | 3/2003 | Ball | H04L 41/12 |
| | | | | 709/224 |
| 2008/0140817 | A1* | 6/2008 | Agarwal | H04L 67/125 |
| | | | | 709/223 |
| 2009/0150131 | A1* | 6/2009 | Parthasarathy | G05B 23/0281 |
| | | | | 703/7 |
| 2009/0327195 | A1* | 12/2009 | Iscen | G06N 5/042 |
| | | | | 706/47 |
| 2010/0138694 | A1* | 6/2010 | Harrison | G06F 11/0739 |
| | | | | 714/26 |
| 2011/0087924 | A1* | 4/2011 | Kandula | G06F 11/0709 |
| | | | | 714/26 |
| 2012/0278663 | A1* | 11/2012 | Hasegawa | G06F 11/079 |
| | | | | 714/47.1 |
| 2013/0055020 | A1* | 2/2013 | Krishnan | G06F 11/079 |
| | | | | 714/26 |
| 2013/0097183 | A1* | 4/2013 | McCracken | G06F 11/079 |
| | | | | 707/748 |
| 2014/0006862 | A1 | 1/2014 | Jain et al. | |
| 2015/0347214 | A1* | 12/2015 | Samuni | G06F 11/0751 |
| | | | | 714/37 |
| 2016/0124787 | A1 | 5/2016 | Helgeson et al. | |
| 2016/0162346 | A1* | 6/2016 | Kushnir | G06F 11/0709 |
| | | | | 714/37 |
| 2016/0359678 | A1* | 12/2016 | Madani | G06F 16/24578 |
| 2017/0068581 | A1* | 3/2017 | Qi | H04L 41/5009 |
| 2017/0075744 | A1* | 3/2017 | Deshpande | G06F 11/0709 |
| 2017/0161131 | A1* | 6/2017 | Noll | H04L 67/1097 |
| 2017/0353991 | A1* | 12/2017 | Tapia | G06Q 10/20 |
| 2019/0165988 | A1* | 5/2019 | Wang | H04L 41/0631 |

OTHER PUBLICATIONS

Su, C. et al.; "Big Data Preventive Maintenance for Hard Disk Failure Detection"; Jul. 2018; 11 pages.

Zhang, S. et al.; "Prefix: Switch Failure Prediction in Datacenter Networks"; Mar. 2018; 29 pages.

* cited by examiner

Obtaining a first graph representing a first set of combinations of computing elements and logical elements used in a computing environment, the first graph comprising a base node representing a base computing element and a plurality of connected nodes connected to the base node, each connected node representing one of a plurality of connected elements connected to the base computing element, wherein connections between the base computing element and the plurality of connected elements form the first set of combinations, and the first set of combinations comprises a plurality of element combinations, each element combination comprising a connection between the base computing element and a connected element 502

Computing a risk score of the first set of combinations based on an instance count and a failure count of the first set of combinations, the instance count of the first graph being a total number of instances of the first set of combinations in the computing environment and the failure count being a number of instances of the total number of instances in which the base computing element encountered a failure 504

In response to the risk score of the first set of combinations exceeding a threshold, comparing the first set of combinations with a second set of combinations of computing elements and logical elements represented by a second graph the comparing being performed using the first graph and the second graph, for identifying an element combination of the first set of combinations that is a likely cause for the risk score exceeding the threshold 506

Fig. 5

COMPUTING ELEMENT FAILURE IDENTIFICATION MECHANISM

BACKGROUND

A computing element, such as a server, may be part of a computing environment, such as a data center. The computing element may be connected to and work in conjunction with several other elements in the computing environment. Sometimes, the computing element may fail, such as report an error or turn off abruptly.

BRIEF DESCRIPTION OF DRAWINGS

The following detailed description references the figures, wherein:

FIG. 5 illustrates a method for identifying cause of failure of computing elements in a computing environment, according to an example implementation of the present subject matter.

DETAILED DESCRIPTION

Figure 1:
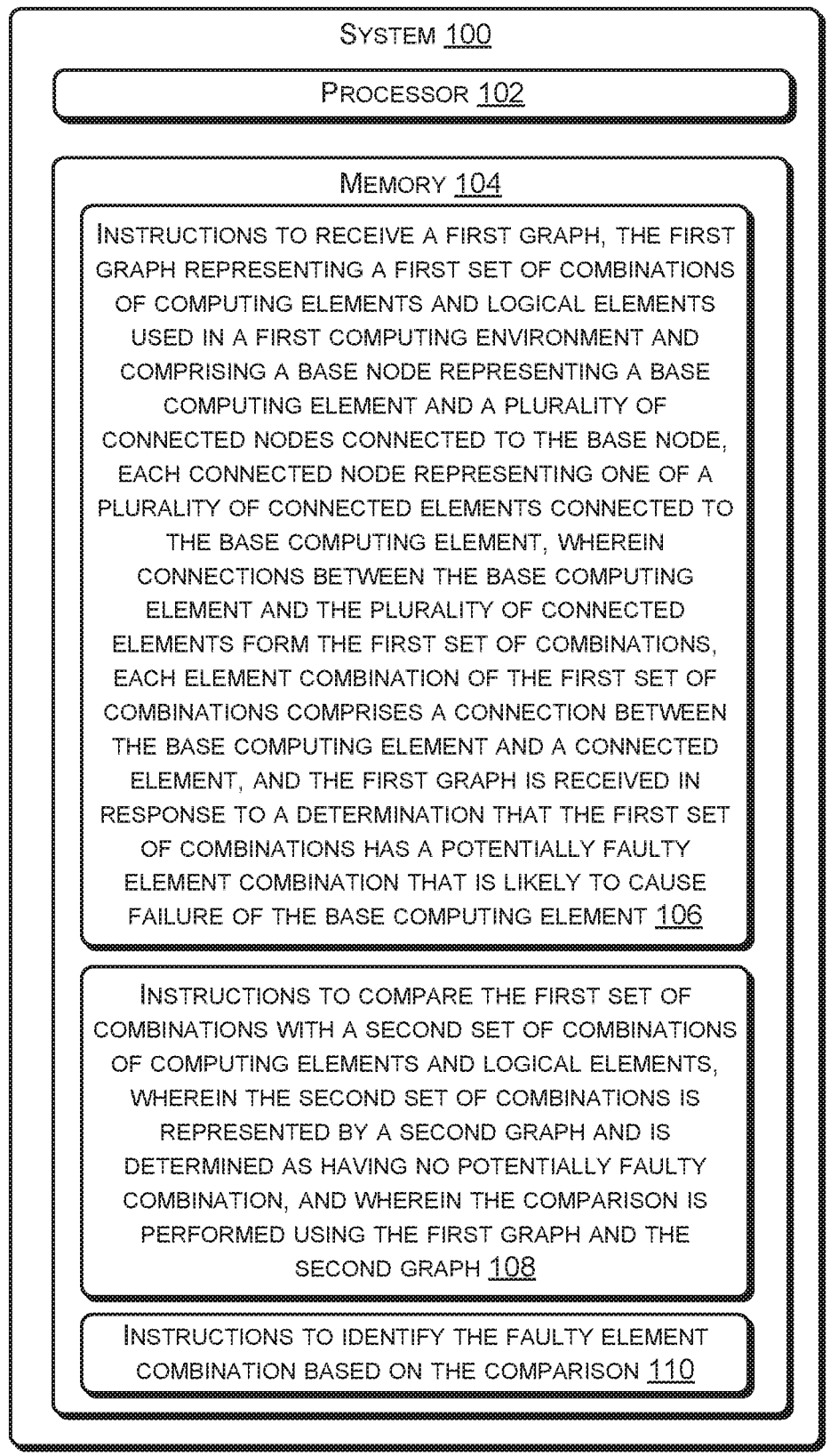
FIG. 1 illustrates a system for identification of cause of failure of computing elements in a computing environment, according to an example implementation of the present subject matter.

A computing environment, such as a data center, may include several elements. The elements may include computing elements, such as server and network adapter, and logical elements, such as firmware and software installed on the computing elements. Such elements may be connected to each other, and may work in conjunction with each other in the computing environment. For example, the server may be connected to the network adapter for communicating over a network. Further, the network adapter may have firmware installed on it to enable the network adapter to perform its computing functions.

In some cases, two elements may be incompatible with each other, and if they are used in conjunction with each other, one or both the elements may fail. For instance, if the server and the network adapter are incompatible with each other, and if the server and the network adapter are connected to each other, the server may report network-related errors or the network adapter may drop packets. The incompatibility between two elements may occur, for example, if a particular version of one element is not configured to work with a particular version of another element. However, generally, it is not possible to identify elements that are incompatible with each other. As a result, the incompatible elements may be used in conjunction with each other in the computing environment, causing the elements to fail.

The present subject matter relates to identification of causes of failure of computing elements in a computing environment. With the implementations of the present subject matter, combinations of elements that are likely to cause failure of computing elements can be identified.

In accordance with an example implementation, a first graph representing a first set of combinations of computing elements and logical elements is received. The first set of combinations can be used in a computing environment, such as a data center. In an example, the first graph includes a base node representing a base computing element, such a server, and a plurality of connected nodes connected to the base node. Each connected node represents one of a plurality of connected elements connected to the base computing element. The connected elements may include a base logical element installed on the base computing element and an auxiliary logical element installed on an auxiliary computing element. The base logical element may be, for example, a basic input/output system (BIOS) and the auxiliary computing element may be, for example, a network adapter.

The connections between the base computing element and the plurality of connected elements form the first set of combinations. Each element combination of the first set of combinations includes a connection between the base computing element and a connected element.

The first graph may be received in response to a determination that the first set of combinations has a potentially faulty element combination that is likely to cause failure of the base computing element. In an example, the first set of combinations may be determined to have a potentially faulty element combination based on a total number of instances of the first set of combinations in the computing environment and a number of instances of failures of the base computing element among the total number of instances.

The first set of combinations may be compared with a second set of combinations of computing elements and logical elements. The second set of combinations may be represented by a second graph and may be identified as having no potentially faulty combination. The comparison may be performed with the help of the first graph and the second graph. For the comparison, a first set of node combinations that is formed from the first graph and that represents the first set of combinations may be compared with the second set of node combinations that is formed from the second graph and that represents the second set of combinations. Based on the comparison, the potentially faulty element combination in the first set of combinations may be identified.

Using the present subject matter, a computing environment may be represented in the form of a plurality of graphs. Such graphs represent combinations of elements used in the computing environment. By comparing combinations of elements represented by one graph with combinations of elements represented by another graph, potentially faulty combinations, i.e., element combinations that may cause failure of computing elements can be identified.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

Example implementations of the present subject matter are described with regard to elements of a data center. Although not described, it will be understood that the implementations of the present subject matter can be used for any computing environment in which particular combinations of elements may cause failure of a computing element.

FIG. 1 illustrates a system 100 for identification of cause of failure of computing elements in a computing environment, according to an example implementation of the present subject matter. The system 100 may be implemented as any of a variety of computing systems, such as a desktop computer, a laptop computer, and a server. The system 100 includes a processor 102 and a memory 104 coupled to the processor 102.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 may fetch and execute computer-readable instructions stored in the memory 104. The computer-readable instructions, hereinafter referred to as instructions, includes instructions 106, instructions 108, and instructions 110. The functions of the processor 102 may be provided through the use of dedicated hardware as well as hardware capable of executing machine readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, when executed by the processor 102, the instructions 106 enable receiving a first graph (not shown in FIG. 1) that represents a first set of combinations of computing elements and logical elements. The first set of combinations of computing elements and logical elements may be referred to as first set of element combinations or the first set of combinations, and may be used in a first computing environment, such as a first data center (not shown in FIG. 1). The first graph includes a base node and a plurality of connected nodes connected to the base node. The base node represents a base computing element, which may be a tangible element that performs computing functions. An example of a base computing element is a server. Each connected node represents a connected element connected to the base computing element. Accordingly, the plurality of connected nodes represents a plurality of connected elements, each of which is connected to the base connected element.

Each connected element may be, for example, a base logical element or an auxiliary logical element. The base logical element may be installed on the base computing element and may be, for example, a piece of software or a piece of firmware. A piece of software may be interchangeably referred to as software and a piece of firmware may be interchangeably referred to as firmware. An auxiliary logical element may be installed on an auxiliary computing element connected to the base computing element, and may also be software or firmware. An auxiliary computing element may refer to a tangible element, such as a piece of hardware, that performs a computing function. Examples of an auxiliary computing element include a network adapter, a baseboard management controller (BMC), an interconnect, and a switch.

As mentioned earlier, each connected element is connected to the base computing element. The connections between the base computing element and the plurality of connected elements form the first set of combinations. The first set of combinations includes a plurality of element combinations. Each element combination of the first set of combinations includes a connection between the base computing element and a connected element.

In an example, the instructions 106 enable receiving the first graph in response to a determination that the first set of combinations has a potentially faulty element combination that is likely to cause failure of the base computing element. The determination that the first set of combinations has a potentially faulty element combination may be performed based on a risk score of the first graph, as will be explained with reference to the subsequent figures.

Upon receiving the first graph, the instructions 108, when executed by the processor 102, enables comparing the first set of combinations with a second set of combinations of computing elements and logical elements. The second set of combinations of computing elements and logical elements may be referred to as the second set of element combinations or the second set of combinations, and is represented by a second graph (not shown in FIG. 1). The second set of combinations may be a set of combinations that is similar to the first set of combinations. For example, the second set of combinations may have the same base computing element as the first set of combinations and differ from the first set of combinations by a minimal number of element combinations. The second graph may have been determined as having no potentially faulty combination, for example, based on its risk score.

As mentioned earlier, the first graph includes connections between the base node and the plurality of connected nodes. Such connections form a first set of node combinations, which represents the first set of combinations. Similarly, a second set of node combinations is formed from the second graph, and the second set of node combinations may represent the second set of combinations. Accordingly, the comparison of the first set of combinations and the second set of combinations may be achieved by comparing the first set of node combinations with the second set of node combinations. The comparison using the first graph and the second graph is explained in greater detail with reference to FIGS. 3(a) and 3(b).

Subsequently, the instructions 110, when executed by the processor 102, enable identifying the potentially faulty element combination based on the comparison of the first set of combinations and the second set of combinations. For example, an element combination that is present in the first set of combinations, but absent in the second set of combinations, may be identified as the potentially faulty element combination.

The first graph, second graph, first set of combinations, and second set of combinations, comparison of the first set of combinations and second set of combinations, and other details of the present subject matter will be explained in greater detail with reference to the subsequent figures.

Figure 2:
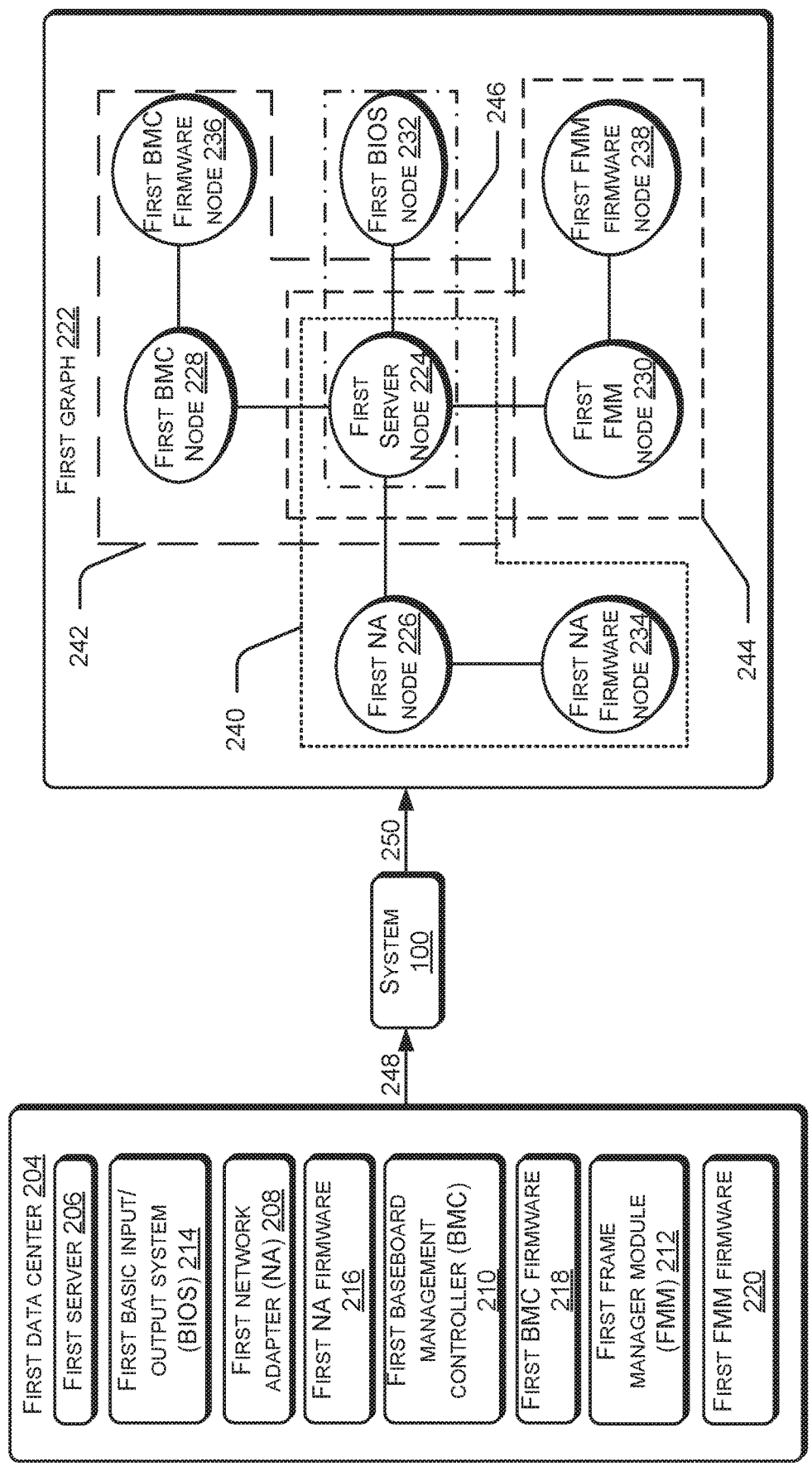
FIG. 2 illustrates a first graph representing a first set of combinations used in a computing environment, according to an example implementation of the present subject matter.

FIG. 2 illustrates a first graph representing a first set of combinations used in a first computing environment, according to an example implementation of the present subject matter. The first computing environment may include a plurality of elements, such as computing elements and logical elements. The elements may be connected among each other. Some connections may be collectively referred to a set of element combinations or a set of combinations. The connections which, together, can be considered as a set of combinations is explained later. The consideration of certain connections in the computing environment as a set of combinations can facilitate identification of particular element combination in the set of element combinations that may cause failure of computing elements.

The first computing environment may be, for example, a first data center 204. Hereinafter, the first computing environment will be explained with reference to the first data center 204. However, it is to be understood that the first computing environment may be any other computing environment as well. Further, in the below explanation, the base computing element is explained with reference to a first server 206. However, it is to be understood that the present subject matter can be utilized in scenarios in which the base computing element is a different device, such as a first network adapter 208.

The first data center 204 includes a plurality of elements. For example, the first data center 204 includes a plurality of tangible elements, such as the first server 206, the first network adapter 208, a first BMC 210, and a first frame manager module (FMM) 212, that perform computing functions. For example, the first network adapter 208 may enable a computing device, such as the first server 206, to communicate over a network with other computing devices. The first BMC 210 may enable remote monitoring and management of a computing device, such as the first server 206. Further, the first FMM 212 may enable discovery and management of a frame housing several devices, such as the first server 206, first network adapter 208, and first BMC 210. The tangible elements that perform computing functions may be referred to as computing elements.

In addition to the computing elements, the first data center 204 may include non-tangible elements that enable the computing elements to perform computing functions. Such non-tangible elements may be hereinafter referred to as logical elements. The logical elements may be firmware or software installed on the computing elements. The logical elements may include, for example, a first basic input/output system (BIOS) 214 installed on the first server 206, a first firmware 216 installed on the first network adapter 208, a first firmware 218 installed on the first BMC 210, and a first firmware 220 installed on the first FMM 212. The first firmware 216, first firmware 218, and first firmware 220 may be referred to as the first network adapter firmware 216, first BMC firmware 218, and first FMM firmware 220, respectively.

Each element of the first data center 204 may be identified by various identification parameters, such as a manufacturer name, a model name, a version number, and the like. If two elements have the same identification parameters, they may be said to be identical, while if two elements differ from each other by an identification parameter, the two elements may be said to be different from each other. For example, while BIOS having version 1.0 may be referred to as the first BIOS 214, BIOS having version 2.0 may be referred to as a second BIOS (not shown in FIG. 2).

In an example, an element of the first data center 204 may be connected to another element of the first data center 204. In an example, the connection may be a physical connection. For example, the first server 206 may be connected to the first network adapter 208 for facilitating the first server 206 to communicate with other devices, such as with other servers and client devices (not shown in FIG. 2). Similarly, the first server 206 may be connected to the first BMC 210 for enabling remote monitoring and management of the first server 206. Further, the first server 206 may be connected to the first FMM 212 for enabling power management of the first server 206 and enabling network connectivity between the first server 206 and the first BMC 210. In cases of logical elements, the connection between the logical element and a tangible element may be achieved by installation of the logical element on the computing element. For example, the first BIOS 214, installed on the first server 206, may be referred to as being connected to the first server 206. Similarly, the first network adapter firmware 216, first BMC firmware 218, and first FMM firmware 220 may be referred to as being connected to the first network adapter 208, first BMC 210, and first FMM 212, respectively. Since, the first network adapter firmware 216, first BMC firmware 218, and first FMM firmware 220 interact with the first server 206 upon installation on the first network adapter 208, first BMC 210, and first FMM 212, respectively, the first network adapter firmware 216, first BMC firmware 218, and first FMM firmware 220 may be said to be connected to the first server 206.

As mentioned above, several logical elements may be connected to one computing element. The connection between each logical element and the computing element may form an element combination. For example, the first network adapter firmware 216, first BMC firmware 218, and first FMM firmware 220 are connected to the first server 206 through the first network adapter 208, first BMC 210, and first FMM 212, respectively. Further, the first BIOS 214 is also connected to the first server 206. Accordingly, a first element combination may include a connection between the first server 206 and the first network adapter firmware 216. Similarly, a second element combination may include a connection between the first server 206 and the first BMC firmware 218. Further, a third element combination may include a connection between the first server 206 and the first FMM firmware 220. Still further, a fourth element combination may include a connection between the first server 206 and the first BIOS 214.

The connections of several logical elements to one computing element may form part of a set of combinations. The set of combinations including the first element combination, second element combination, third element combination, and fourth element combination may be referred to as the first set of combinations.

The computing element, such as the first server 206, to which several logical elements are connected in a set of combinations may be referred to as a base computing element. Further, the logical elements which are connected to the base computing element may be referred to as connected elements. Among the connected elements, the logical elements, such as the first BIOS 214, that are installed on the base computing element may be referred to as base logical elements, and the logical elements installed on other computing elements, such as the first network adapter 208, first BMC 210, and first FMM 212, connected to the base computing element are referred to as auxiliary logical elements. Further, the computing elements connected to the base computing element are referred to as auxiliary computing elements. In an example, the auxiliary computing elements are directly connected to the first server 206, and not through an intermediary computing element. Accordingly, the auxiliary computing elements may be referred to as being one-hop neighbors of the base computing element.

Since an auxiliary logical element is connected to the base computing element through an auxiliary computing element on which it is installed, the element combination including a connection between the base computing element and the auxiliary computing element includes a first sub-connection between the base computing element and the auxiliary computing element and a second sub-connection between the auxiliary computing element and the auxiliary logical element. For example, the first element combination includes a first sub-connection between the first server 206 and the first network adapter 208 and a second sub-connection between the first network adapter 208 and the first network adapter firmware 216.

Although each element combination is explained as a connection between the base computing element and a logical element, in some cases, an element combination may be a connection between the base computing element and an auxiliary computing element. In other words, in some cases, the connected element may be an auxiliary computing element, and not an auxiliary logical element.

In some cases, an element combination of a set of combinations may cause failure of a base computing element of the set of combinations. A failure of a base computing element may include one or more of: non-functioning of the base computing element, the base computing element operating at a sub-optimal level, an operating parameter of the base computing element being outside its respective normal operating range, a component of the base computing element being in a non-functional state, a component operating at a sub-optimal level, or an operating parameter of a component being outside its normal operating range. A failure of the base computing element may be caused by an element combination, for example, due to incompatibility between the base computing element and the connected element. For example, the first server 206 may fail due to incompatibility between the first server 206 and first FMM firmware 220.

To identify an element combination that may cause a base computing element to fail, a graph representing the set of combinations may be utilized. The graph may include nodes representing the base computing element and various connected elements. The graph may also include edges that represent connections between the elements. The node representing the base computing element may be referred to as a base node and each node representing a connected element may be referred to as a connected node.

A first graph 222 representing the first set of combinations includes nodes representing the first server 206, first network adapter 208, first BMC 210, first FMM 212, first BIOS 214, first network adapter firmware 216, first BMC firmware 218, and first FMM firmware 220. The nodes representing the first server 206, first network adapter 208, first BMC 210, first FMM 212, and first BIOS 214 are a first server node 224, first network adapter node 226, first BMC node 228, first FMM node 230, first BIOS node 232, first network adapter firmware node 234, first BMC firmware node 236, and first FMM firmware node 238, respectively. Accordingly, in the first graph 222, the first server node 224 is the base node, and the first network adapter firmware node 234, first BMC firmware node 236, and first FMM firmware node 238 may be the connected nodes. Further, the first network adapter node 226, first BMC node 228, first FMM node 230, and first BIOS node 232 may be referred to as auxiliary computing nodes.

Further, the element combinations of the first set of combinations are represented by the first graph 222 using node combinations, each of which represents an element combination. A node combination that represents an element combination may be referred to as the node combination corresponding to the element combination. Further, the node combinations representing the first set of combinations may be referred to as a first set of node combinations.

The first set of node combinations includes a first node combination 240 that represents the first element combination, which includes the connection between the first server 206 and the first network adapter firmware 216. Similarly, a second node combination 242 represents the second element combination, which includes the connection between the first server 206 and the first BMC firmware 218. Further, a third node combination 244 represents the third element combination, which includes the connection between the first server 206 and the first FMM firmware 220. Still further, a fourth node combination 246 represents the fourth element combination, which includes the connection between the first server 206 and the first BIOS 214.

Since the first node combination 240, second node combination 242, third node combination 244, and fourth node combination can be deduced from the first graph 222, the first node combination 240, second node combination 242, third node combination 244, and fourth node combination may be said to be formed from the first graph 222. More generally, a set of node combinations that can be deduced from a graph may be referred to as being formed from the graph.

In an example, the first graph 222 and other graphs representing other sets of combinations may be generated by the system 100. For generating the graphs, the system 100 may first receive a graphical representation of the entire first data center 204. The graphical representation of the first data center 204 may be referred to as a super-graph (not shown in FIG. 2). The system 100 may divide the super-graph into several preliminary graphs, such that each preliminary graph represents a set of combinations. Since each preliminary graph is to represent a set of combinations, the system 100 may divide the super-graph such that each preliminary graph has (i) a base node representing a base computing element, (ii) a base logical node representing a base logical element installed on the base computing element, (iii) auxiliary computing nodes connected to the base node, each auxiliary computing node representing an auxiliary computing element, and (iv) auxiliary logical nodes, each representing an auxiliary logical element installed on an auxiliary computing element.

Subsequently, the preliminary graphs generated may be compared against each other for redundancy, i.e., to identify identical preliminary graphs. For instance, the system 100 may determine if several instances of the first graph 222 are generated. The preliminary graphs may have redundancy if the first data center 204 includes several instances of a particular set of combinations. For example, if the first set of combinations is present in hundred different locations within the first data center 204, hundred instances of the first graph 222 may be generated by the system 100. The system 100 may then remove all the redundant preliminary graphs. Thus, a unique set of graphs, i.e., a set of graphs having no two identical graphs is obtained. The redundant graphs may be removed for computing risk scores for sets of combinations, which will be explained with reference to FIG. 3(a).

The generation of the set of graphs based on the plurality of combinations in the first data center 204 is represented by arrows 248 and 250. In addition to generating the set of graphs based on the first data center 204, the system 100 may generate preliminary graphs from a second data center (not shown in FIG. 2) as well. The preliminary graphs generated from the second data center may also be added to the set of graphs after removing redundant graphs. Thus, the set of graphs may include graphs representing sets of combinations used in both the first data center 204 and the second data center. Further, if a new set of combinations is implemented in the first data center 204 or the second data center, a graph representing the new set of combinations may be generated by the system 100. Therefore, the set of graphs can remain updated with all sets of combinations usable in computing environments. In an example, the set of graphs may be stored in a global knowledge repository (GKR) (not shown in FIG. 2).

The identification of the element combination that causes failure of a base computing element will now be explained with reference to a scenario in which the first set of combinations is identified as having an element combination that causes failure of the first server 206. To identify the element combination that causes failure of the first server 206, the first set of combinations may be compared with a second set of combinations represented by a second graph (not shown in FIG. 2), as will be explained with reference to FIGS. 3(*a*) and 3(*b*).

FIG. 3(*a*) illustrates comparison of the first set of combinations with a second set of combinations, according to an example implementation of the present subject matter. The comparison of the sets of combinations may be initiated in response to a determination that the first set of combinations has an element combination that is likely to cause failure of the first server 206. Such a determination may be performed based on a total number of instances of the first set of combinations in the first data center 204 and a number of instances among the total number of instances in which the first server 206 failed, as will be explained below:

As mentioned earlier, the first set of combinations may be used in several locations within the first data center 204. Accordingly, several instances of the first set of combinations may be found in the first data center 204. The total number of instances of the first set of combinations in the first data center 204 may be referred to as an instance count (IC) 302 of the first set of combinations. Of all the instances of the first set of combinations in the data center 204, in some instances, the first server 206 may have failed. For example, if 100 instances of the first set of combinations is present in the first data center 204, in 90 of those 100 instances, the first server 206 may have failed. The number of instances among the total number of instances of the first set of combinations in which the first server 206 encountered a failure may be referred to as a failure count (FC) 304 of the first set of combinations.

Based on the IC 302 and the FC 304 of the first set of combinations, a risk score 306 may be computed for the first set of combinations. The risk score 306 of the first set of combinations indicates a likelihood that the first server 206 will fail if deployed in the first set of combinations. The first server 206 may fail if deployed in the first set of combinations due to a particular element combination in the first set of combinations. Therefore, the first set of combinations indicates a likelihood that an element combination in the first set of combinations is likely to cause the failure of the first server 206. In an example, the risk score 306 may be computed as a ratio of FC 304 of the first set of combinations and IC 302 of the first set of combinations. This may be mathematically represented as:

$$\text{Risk score} = FC/IC \tag{1}$$

In an example, the first set of combinations may be present in the second data center as well (not shown in FIG. 3(*a*)). In such a case, the instance count and failure count of the first set of combinations may be computed in the second data center as well. The instance count and failure count of the first set of combinations in the second data center may be referred to as second instance count (Second IC) 308 and second failure count (Second FC) 310, respectively, of the first set of combinations. To distinguish between the second instance count 308 and the IC 302, the latter may be referred to as the first instance count (First IC) 302. Similarly, FC 304 may be referred to as the first failure count (First FC) 304. In case the first set of combinations is present in the second data center as well, the risk score 306 may be computed as below:

$$\text{Risk score} = (\text{First FC} + \text{Second FC})/(\text{First IC} + \text{Second IC}) \tag{2}$$

As will be understood, in the manner as explained above, the risk score 306 of the first set of combinations may be computed based on the instance count and failure count of the first set of combinations in all the data centers in which the first set of combinations is found. In an example, the risk score, instance counts, and failure counts of the first set of combinations may be provided as a tag along with the first graph 222, as illustrated in FIG. 3(*a*).

As mentioned earlier, the risk score 306 of the first set of combinations indicates the likelihood that the first set of combinations includes an element combination that causes failure of the first server 206. An element combination that is likely to cause failure of the first server 206 may be referred to as a potentially faulty element combination. In an example, the system 100 may determine the first set of combinations as having a potentially faulty element combination in response to the risk score 306 being greater than a threshold value.

Upon determining that the first set of combinations has a potentially faulty element combination, the instructions 108 and 110 may enable identifying which of the element combinations in the first set of combinations is potentially faulty. To identify the potentially faulty element combination, the first set of combinations may be compared with other sets of combinations. The comparison may be performed using the first set of node combinations. Since the first set of node combinations correspond to the first set of combinations, the comparison of the first set of node combinations with other sets of node combinations, as explained below, achieves comparison of the first set of combinations with other sets of combinations.

The first set of node combinations may be compared with several sets of node combinations, each of which is formed from a graph that is part of the set of graphs in the GKR. In an example, the first set of node combinations may be compared with those graphs that have the same base node as the first set of node combinations. The comparison of the first set of node combinations with another set of node combinations may include comparing each node combination of the first set of node combinations with each node combination of the other set of node combinations to identify the node combinations that are present in the first set of node combinations, but absent in the other set of node combinations.

In an example, the comparison may continue until the first set of node combinations is compared against sets of node combinations that are similar to the first set of node combinations and that have a risk score lesser the threshold value. A degree of similarity between the first set of node combinations and another set of node combinations may be determined based on a number of node combinations that are present in the first set of node combinations, but absent in the other set of node combinations. Lower the number of node combinations that are present in the first set of node combinations, but absent in the other set of node combinations, higher is the similarity between the first set of node combinations and the other set of node combinations. For example, if a set of node combinations includes all but one node combination of the first set of node combinations, the set of node combinations may be considered to be highly similar to the first set of node combinations.

Since comparison of node combinations involves comparing each node combination of the first set of node combinations with each node combination of another set of node combinations, upon completion of the comparison, the degree of similarity between the first set of node combinations and the other set of node combinations may be determined. In an example, the comparison may continue until a second set of node combinations is found that is different from the first set of node combinations by one node combination. The second set of node combinations may be formed from a second graph 312, and may include the first node combination 240, second node combination 242, fourth node combination 246, and fifth node combination 314. The fifth node combination 314 may be include a connection between the first server node 224 and a second FMM firmware node 315 through the first FMM node 230.

Consider that a second set of combinations, represented by the second set of node combinations, has a risk score 316 that is less than the threshold value. As will be understood, the risk score 316 of the second set of combinations may be computed based on a first instance count 318, second instance count 322, first failure count 320, and second failure count 324 of the second set of combinations.

Upon comparing the first set of node combinations with the second set of node combinations, the system 100 identifies that the second set of combinations includes the fifth node combination 314 in lieu of the third node combination 244. Since all other node combinations are same between the first set of node combinations and the second set of node combinations, and since the second set of combinations, which are represented by the second set of node combinations, has a risk score lesser than the threshold value, the system 100 may deduce that the element combination corresponding to the third node combination 246 is the cause of high risk score of the first set of combinations. Accordingly, the system 100 identifies that the third element combination is likely to be the potentially faulty element combination, which causes failure of the first server 206.

In the manner explained above, node combinations formed from graphs can be compared with each other to identify element combinations causing failure of elements.

Although the above comparison is explained with reference to a scenario in which the second graph 312 is different from the first graph 222 by a single connected node, in some cases, such a graph may not be present in the GKR. Even if such a graph, being different from the first graph 222 by a single node, is obtained, the graph may not have a risk score lesser than the threshold value. In either of the above cases, it may not be possible to isolate a single element combination as the potentially faulty combination. The identification of the potentially faulty combination in such cases is explained with reference to FIG. 3(b).

Figure 3A:
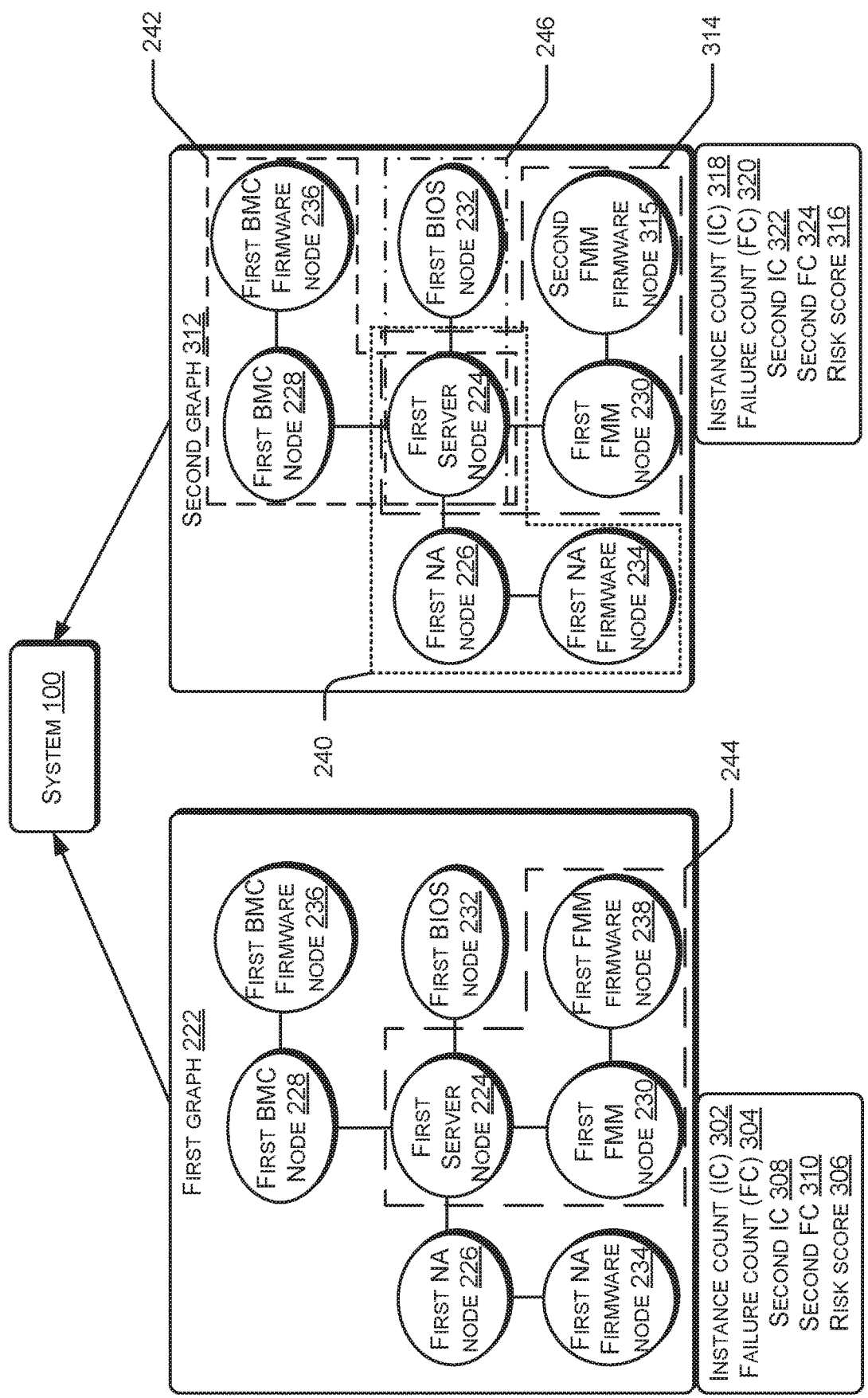
FIG. 3(a) illustrates comparison of a first set of combinations with a second set of combinations, according to an example implementation of the present subject matter.
Figure 3B:
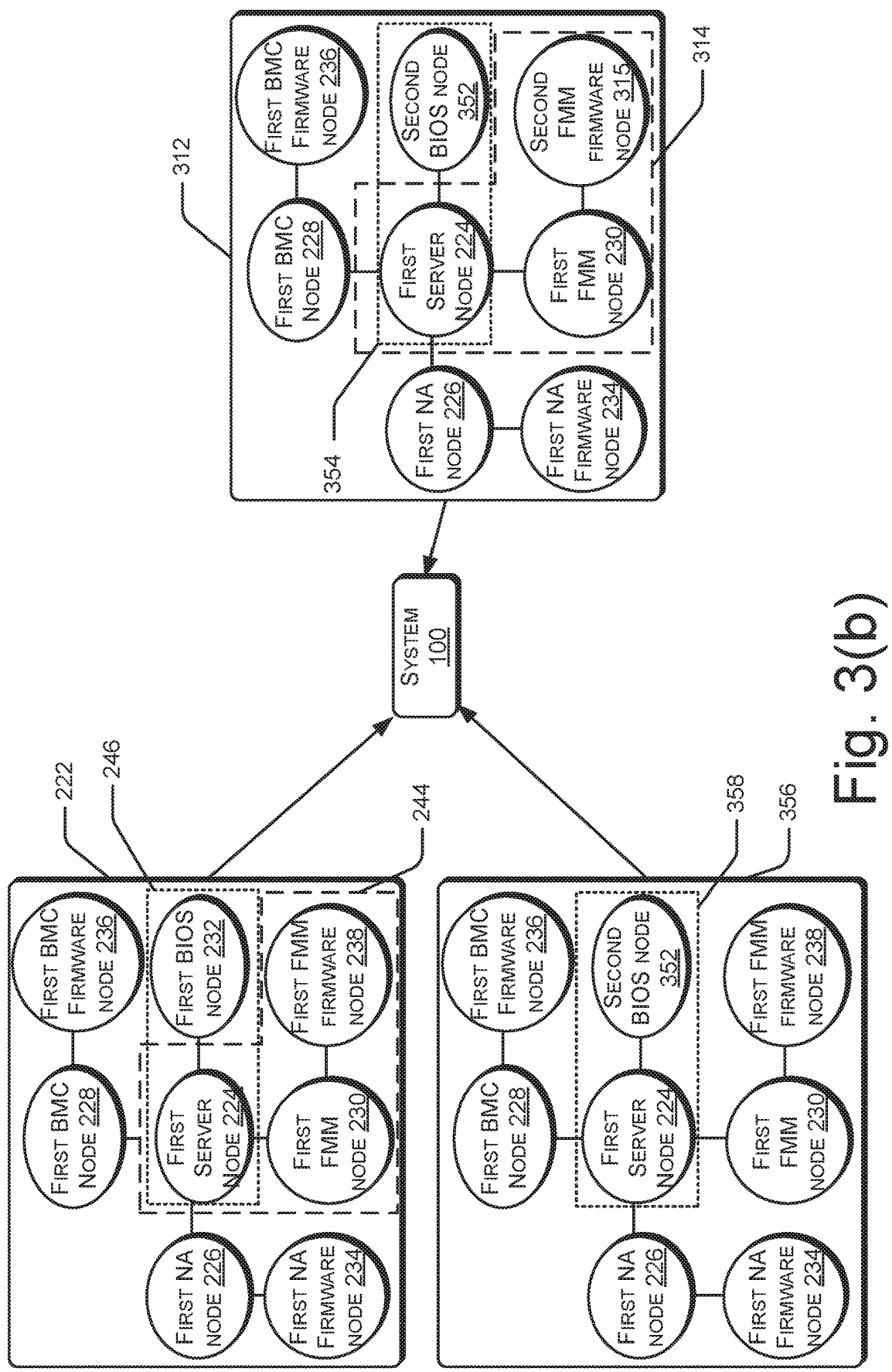
FIG. 3(b) illustrates comparison of sets of node combinations for identifying a potentially faulty element combination, according to an example implementation of the present subject matter.

FIG. 3(b) illustrates comparison of sets of node combinations for identifying a potentially faulty element combination, according to an example implementation of the present subject matter. Here, the second graph 312 may have a risk score lesser than the threshold value, but may have more than one node that is absent in the first graph 222. For example, the second graph 312 may have the second FMM firmware node 315 and a second BIOS node 352, both of which are absent in the first graph 222. Accordingly, the second set of node combinations includes two node combinations, i.e., the fifth node combination 314 and a sixth node combination 354, that are absent in the first set of node combinations. Further, the first set of node combinations includes two node combinations, i.e., the third node combination 244 and the fourth node combination 246, that are absent in the second set of node combinations. Therefore, upon comparison of the first set of node combinations and the second set of node combinations, the system 100 may determine that the potentially faulty element combination may be either the third element combination (which corresponds to the third node combination 244) or the fourth element combination (which corresponds to the fourth node combination 246). However, it may not be possible to ascertain which of the third element combination and the fourth element combination is potentially faulty.

To facilitate identification of the potentially faulty element combination, other sets of node combinations may be utilized. For instance, while the first set of node combinations is compared with the other sets of node combinations, a third set of node combinations may be found that is different from the first set of node combinations by a single node combination. The third set of node combinations may be represented by a third graph 356 and may include all node combinations present in the first set of node combinations except the fourth node combination 246. In lieu of the fourth node combination 246, the third set of node combinations may include a seventh node combination 358 that corresponds to a seventh element combination. Further, a third set of combinations, corresponding to the third set of node combinations, may have the risk score greater than the threshold value. Therefore, upon comparing the first set of node combinations with the third set of node combinations, the system 100 may deduce that, even if the fourth element combination is replaced with the seventh element combination in the first set of combinations, the risk score of the first set of combinations still remains above the threshold value. Therefore, the system 100 determines that the fourth element combination is not the potentially faulty element combination.

Therefore, based on the comparison of the first set of node combinations with the second set of node combinations and the third set of node combinations, the system 100 may identify that the third element combination is likely to be the potentially faulty element combination.

In the above manner, by comparing the first set of node combinations with a plurality of sets of node combinations, and by considering the risk scores of each set of node combinations, the system 100 may identify the potentially faulty element combination. In an example, to identify the potentially faulty element combination, the system 100 may utilize a machine learning technique. The system 100, when utilizing the machine learning technique, may be supplied with the set of graphs in the GKR, the instance count of each graph in the GKR, and the failure count of each graph in the GKR. The system 100 may then determine which set of node combinations are to be compared with the first set of node combinations, perform the comparison, and identify the potentially faulty element combination in the first set of combinations based on the risk score of each of the compared set of combinations.

In an example, when the machine learning technique is used for identification of the potentially faulty combination, the threshold value may not be used for identification of the potentially faulty combination. For instance, the system 100 may not determine whether the risk score of the second set of combinations and that of the third set of combinations is greater than or lesser than the threshold value. Instead, the system 100, in addition to comparing the first set of combinations with other sets of combinations, may consider the risk scores of the each set of combinations so compared. Based on the similarity of the first set of combinations with each set of combinations compared and based on the risk score of the set of combinations compared, the system 100 may identify the potentially faulty combination. Thus, using the machine learning technique, several sets of combinations may be compared with the first set of combinations and the risk scores of each of those combinations may be considered. Therefore, the potentially faulty element combination may be identified with a high accuracy.

In the manner as explained above, the potentially faulty element combination that may cause the failure of the first server 206 can be identified. As will be understood, such a procedure may be performed to identify the element combinations that may cause of failure of any computing element in the first data center 204.

Although the above explanation is described with respect to a scenario in which an incompatibility exists between the base computing element and an auxiliary logical element, in some cases, an incompatibility may exist between the base logical element and the auxiliary logical element. Accordingly, the base computing element may fail due to an aggregation of two element combinations: (i) element combination of the auxiliary logical element and the base computing element and (ii) element combination of the base computing element and the base logical element. For example, the first server 206 may fail due to an incompatibility between the first BIOS 214 and the first FMM firmware 220. Even in such a case, by identifying one element combination of the aggregation as the potentially faulty one, it may be ensured that the aggregation of two element combinations is not used in the first data center 204, thereby preventing failure of the base computing element. Further, in an example, to identify the aggregation of element combinations that may cause failure of the first server 204, the system 100 may compare aggregation of combinations formed from the first set of combinations with an aggregation of combinations formed from the other sets of combinations. Each aggregation of combinations may include (i) element combination of the auxiliary logical element and the base computing element and (ii) element combination of the base computing element and the base logical element. Such a comparison of the aggregation of combinations may be performed in addition to the comparison of the element combinations. In an example, comparison of the first set of combinations with the second set of combinations includes comparing the aggregation of combinations formed from the first set of combinations with the aggregation of combinations formed from the second set of combinations.

Although, in the above description, graphs having the first server node 224 as the base node are described, the set of graphs in the GKR may include graphs that have the other nodes as base nodes as well. For example, the set of graphs may include a fourth graph (not shown in FIGS. 1-3(*b*)) having the first network adapter node 226 as its base node and representing a fourth set of combinations. The presence of graphs having different base nodes enables identifying potentially faulty element combinations that cause failure of any computing element. For example, if the fourth set of combinations is identified as having a high risk score, an element combination that is likely to cause failure of the first network adapter 208 may be identified using the fourth graph and other graphs in the GKR, in the manner as explained above.

In an example, the system 100 may update the risk score for each set of combinations. For updating, the system 100 may monitor for failure of each computing element in the first data center 204. If a computing element fails, the system 100 may identify other computing elements connected to the computing element, logical elements installed on the computing element, and logical elements installed on each of the other computing elements. Accordingly, the system 100 may determine a set of combinations that is formed by the connections to the other computing elements and by the installation of the logical elements on the computing element and the other computing elements. The determined set of combinations may be compared against sets of combinations that are represented by the graphs in the set of graphs. For example, if the first server 206 in a location of the first data center 204 fails, and the set of combinations formed by connections of the first server 206 to its connected elements includes the first element combination, second element combination, third element combination, and the fourth element combination, the system 100 may identify the matching set of combinations to be the first set of combinations. Contrarily, if the first server 206 in a location of the first data center 204 fails, and the set of combinations formed by connections of the first server 206 to its connected elements includes the first element combination, second element combination, third element combination, and seventh element combination, the system 100 may identify the matching set of combinations to be the third set of combinations. Upon finding a matching set of combinations, the system 100 may then increment the failure count of the matching set of combinations and compute a revised risk score for the matching set of combinations.

To enable monitoring for the failure of computing elements, the system 100 may be connected to the first data center 204 through a connection (not shown in FIGS. 1-3(*b*)). In an example, the connection may be a communication network. The communication network may be a wireless network or a wired network, or a combination thereof. The communication network may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network includes various network entities, such as transceivers, gateways, and routers.

In an example, the node combinations corresponding to element combinations identified as being potentially faulty may be stored in a repository, as will be explained with reference to FIG. 4. The node combinations corresponding to potentially faulty element combinations may be referred to as potentially faulty node combinations.

Figure 4:
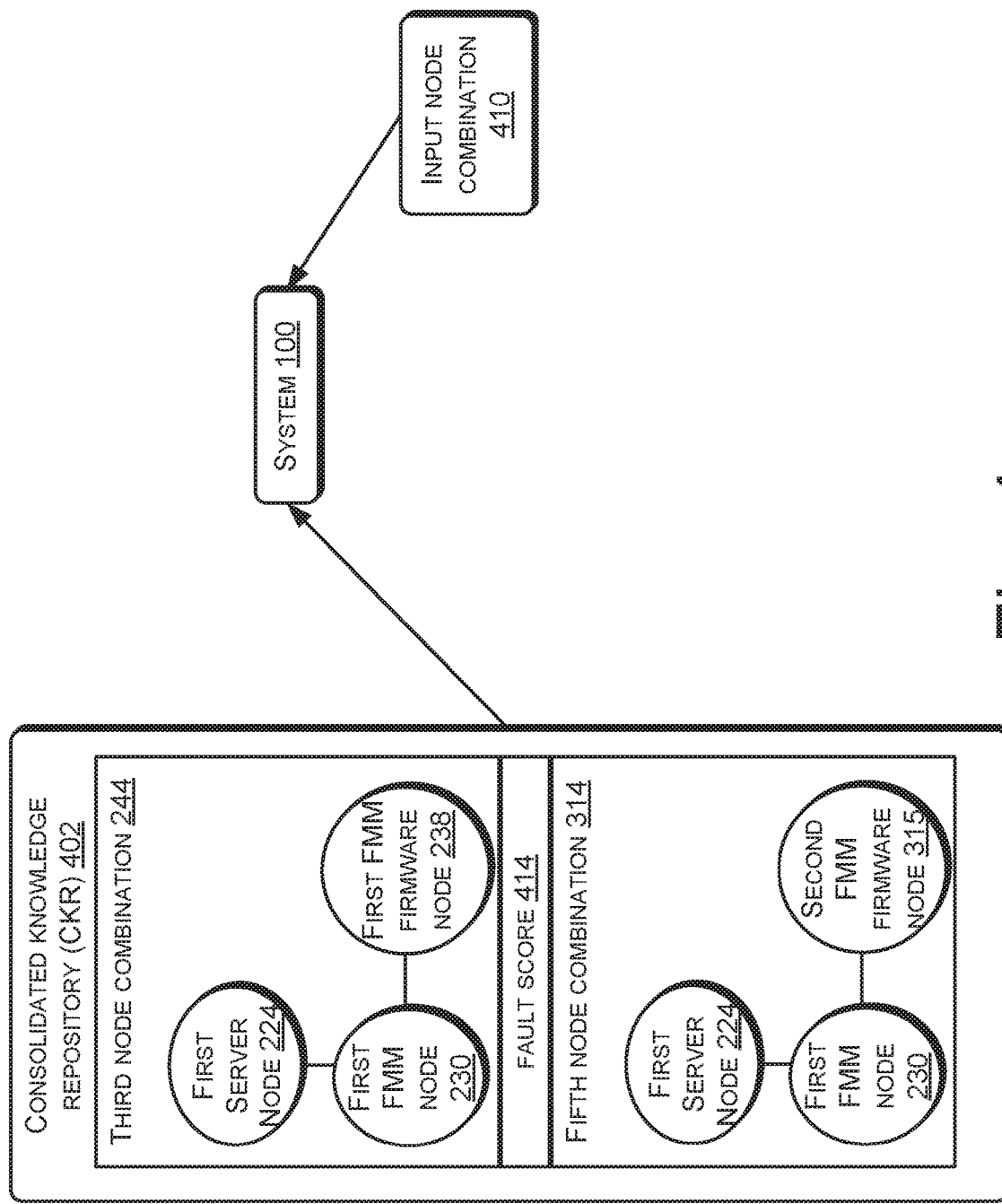
FIG. 4 illustrates a consolidated knowledge repository (CKR) storing a plurality of potentially faulty element combinations, according to an example implementation of the present subject matter.

FIG. 4 illustrates a consolidated knowledge repository (CKR) 402 storing a plurality of potentially faulty node combinations, according to example implementations of the present subject matter.

As explained earlier, the third element combination, represented by the third node combination 244, may be identified as a potentially faulty element combination. Upon such an identification, the third node combination 244 may be stored in the CKR 402. Similarly, node combinations corresponding to other element combinations that are identified as potentially faulty by the system 100 may also be stored in the CKR 402.

Since the CKR 402 may have information of all potentially faulty element combinations, the system 100 may utilize the CKR 402 to identify if an input node combination 410 represents a potentially faulty element combination. For this, the system 100 may receive the input node combination 410 representing an input element combination. The input element combination may have to be deployed in the first data center 204, the second data center, or a third data center. The input node combination 410 may be received in response to a determination, for example, by a data center administrator, to upgrade firmware of a computing element.

Upon receiving the input node combination 410, the system 100 may compare the input node combination 410 with each node combination stored in the CKR 402. If the input node combination 410 matches with any node combination stored in the CKR 402, the system 100 may determine that the input node combination 410 represents a potentially faulty element combination and output the same. For example, if the input node combination 410 is the third node combination 244, the system 100 may output that the third node combination 244 is potentially faulty.

In an example, in addition to the indication that the input node combination is potentially faulty, the system 100 may also output an alternative node combination. The alternative node combination may correspond to an element combination that is identified to be non-faulty. For example, in addition to outputting that the third node combination 244 is faulty, the system 100 may output the fifth node combination 314 to be an alternative combination. To output the alternative node combinations, the CKR 402 may store alternative node combination corresponding to each potentially faulty node combination in the CKR 402. For example, as illustrated, the CKR 402 may store the fifth node combination 314 as the alternative node combination to the third node combination 244.

The alternative set of node combinations may be determined based on the comparison of various sets of node combinations, as explained with reference to FIGS. 3(a) and 3(b). For example, as explained with reference to FIG. 3(a), the second set of node combinations includes the fifth node combination 314 in lieu of the third node combination 244 in the first set of node combinations. Accordingly, the system 100 may determine that the fifth node combination 314 is an alternative to the third node combination 244.

By comparing the input node combination 410 with the potentially faulty node combinations, the present subject matter ensures that faulty element combinations are not deployed in the first data center 204 or any other data center. For example, a firmware upgrade that is likely to cause a computing element failure can be prevented. Therefore, the present subject matter prevents failure of computing elements in the data centers due to faulty element combinations. Further, by providing the alternative set of node combinations, the present subject matter eliminates the effort expended, for example, by an administrator of the data center, to identify a non-faulty element combination.

In an example, the system 100 may compute a fault score of each potentially faulty element combination. Such a fault score may also be stored in the CKR 402 along with the node combination corresponding to the potentially faulty combination. For example, the fault score 414 of the third element combination may be stored along with the third node combination 244. The fault score of an element combination may indicate the likelihood that the element combination will cause failure of the base computing element in the element combination.

The fault score of a potentially faulty combination may be computed based on the risk score of each set of combinations that has the potentially faulty combination. For example, if the third element combination is present in the first set of combinations, third set of combinations, and a tenth set of combinations, the fault score of the third element combination may be computed based on the risk score of each of the first set of combinations, third set of combinations, and a tenth set of combinations. In an example, the fault score of an element combination may be an average of the risk scores of all sets of combinations that have the element combination.

In an example, in addition to node combinations, the CKR 402 may also include aggregations of node combinations (not shown in FIG. 4) corresponding to aggregations of element combinations that are identified as being potentially faulty. The system 100 may also receive input aggregation of node combinations for comparison with the aggregations of node combinations in the CKR 402. Further, the system 100 may also compute fault score of each aggregation of element combinations that is identified as being potentially faulty. Still further, the system 100 may provide alternative aggregation of node combinations for each aggregation of node combinations in the CKR 402.

Although the CKR 402 is shown as being external to the system 100, in an example, the CKR 402 may be stored in the system 100. Similarly, the GKR, including the set of graphs, such as first graph 222, second graph 312, and third graph 356, may also be stored in the system 100.

FIG. 5 illustrates a method 500 for identifying cause of failure of computing elements in a computing environment, according to an example implementation of the present subject matter.

The order in which the method 500 is described is not intended to be construed as a limitation, and any number of the described method blocks may be combined in any order to implement the method 500, or an alternative method. Furthermore, the method 500 may be implemented by processor(s) or computing device(s) through any suitable hardware, non-transitory machine-readable instructions, or a combination thereof.

It may be understood that steps of the method 500 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the method 500 may be implemented in a variety of systems, the method 500 is described in relation to the system 100, for ease of explanation. In an example, the steps of the method 500 may be performed by a processing resource, such as the processor 102.

Referring to method 500, at block 502, a first graph is obtained. The first graph represents a first set of combinations of computing elements and logical elements used in a computing environment, such as a data center. The first graph includes a base node representing a base computing element and a plurality of connected nodes connected to the base node.

Each connected node represents one of a plurality of connected elements connected to the base computing element. Also, connections between the base computing element and the plurality of connected elements form the first set of combinations. Further, the first set of combinations includes a plurality of element combinations, each including a connection between the base computing element and a connected element.

The first graph may be, for example, the first graph 222. The base computing element may be, for example, the first server 206, the connected elements may be, for example, the first BIOS 214, the first network adapter firmware 216, first BMC firmware 218, first FMM firmware 220, and the like. Accordingly, the base node may be, for example, the first server node 224, and the connected nodes may be, for example, the first BIOS node 232, first network adapter firmware node 234, first BMC firmware node 236, and first FMM firmware node 238, and the like.

At block 504, a risk score of the first set of combinations is computed. The risk score may be computed based on an instance count and a failure count of the first set of combinations. The instance count of the first graph is a total number of instances of the first set of combinations in the computing environment and the failure count is a number of instances of the total number of instances in which the base computing element encountered a failure. The instance count and failure count may be, for example, IC 302 and FC 304, respectively, and may be computed in the manner explained with reference to FIG. 3(*a*).

In an example, the first set of combinations may be used in a second computing environment as well. The second computing environment may be a second data center. In such a case, the method 500 may include computing a second instance count and computing a second failure count of the first set of combinations. The second instance count may be a total number of instances of the first set of combinations in the second computing environment. Further, the second failure count may be a number of instances among the total number of instances in which the base computing element encountered a failure. The computation of the risk score based on the second instance count and second failure count may be performed in the manner explained with reference to equation (2).

In response to the risk score of the first set of combinations exceeding a threshold value, at block 506, the first set of combinations is compared with a second set of combinations of computing elements and logical elements, hereinafter referred to as the second set of combinations. The second set of combinations represented by a second graph, such as the second graph 312. The comparison of the first set of combinations and the second set of combinations is achieved using the first graph and the second graph, as will be explained below:

In an example, the comparison of the sets of combinations may be performed with the help of node combinations formed from the first graph and second graph. The node combinations formed from the first graph represent the first set of combinations, and may be referred to as a first set of node combinations. Similarly, the node combinations formed from the second graph represent the second set of combinations, and may be referred to as a second set of node combinations. The first set of node combinations may include, for example, the first node combination 240, second node combination 242, third node combination 244, and fourth node combination 246. Further, the second set of node combinations may include, for example, the first node combination 240, second node combination 242, fourth node combination 246, and fifth node combination 314.

The comparison of the first set of node combinations and the second set of node combinations may involve comparing each node combination of the first set of node combinations with each node combination of the second set of node combinations to identify the node combinations that are present in the first set of node combinations, but absent in the second set of node combinations.

In an example, prior to comparing the first set of combinations with the second set of combinations, the first set of combinations may be compared with a plurality of sets of combinations. Each of the plurality of sets of combinations is represented by a graph. In an example, each of the plurality of sets of combinations may have the same base computing element as the first set of combinations. The comparison may be performed to identify a set of combinations that is different from the first set of combinations by one element combination. For example, by comparing the first set of combinations with a plurality of sets of combinations, a third set of combinations represented by the third graph 356 may be identified. The comparison may be performed using a machine learning technique that takes the plurality of graphs, instance count of each of the plurality of graphs, and failure count of each of the plurality of graphs as inputs, as explained earlier.

The comparison of the first set of combinations with the second set of combinations may be performed to identify an element combination of the first set of combinations that is a likely cause of the risk score exceeding the threshold. In an example, the method 500 includes identifying the element combination that is the likely cause for the risk score exceeding the threshold value based on the comparison and on the risk score of the second graph. For example, as explained with reference to FIG. 3(*a*) if the second set of combinations differ from the first set of combinations by a single element combination, and the second set of combinations has a low risk score, such as a risk score lesser than the threshold value, the element combination of the first set of combinations that is absent in the second set of combinations may be identified as the likely cause. Further, as explained with reference to FIG. 3(*b*), even if the second set of combinations differs from the first set of combinations by two element combinations, the element combination that is the likely cause may be identified using the third set of combinations.

In an example, the method 500 may include identifying an aggregation of element combinations of the first set of combinations that is a likely cause of the risk score exceeding the threshold value. The identification of an aggregation of element combinations as the likely cause may be performed based on the comparison of the first set of combinations with the second set of combinations, as explained earlier. The identification of an aggregation of element combinations as the likely cause may be performed in addition to or instead of identification of an element combination as the likely cause.

As explained earlier, using a plurality of sets of combinations and their respective risk scores, the element combination that is a likely cause for the high risk score of the first set of combinations may be accurately identified. The element combination that is a likely cause may be referred to as a potentially faulty element combination.

In an example, the method 500 includes storing a node combination corresponding to the potentially faulty element combination in a consolidated knowledge repository (CKR) that is to store potentially faulty node combinations. The CKR may be the CKR 402. The method also includes receiving an input node combination representing an input element combination that is to be deployed in one of: the first computing environment, the second computing environment, and a third computing environment. The method may further include comparing the input node combination with each node combination in the CKR to determine whether the input node combination represents a potentially faulty element combination, as explained with reference to FIG. 4.

Figure 6:
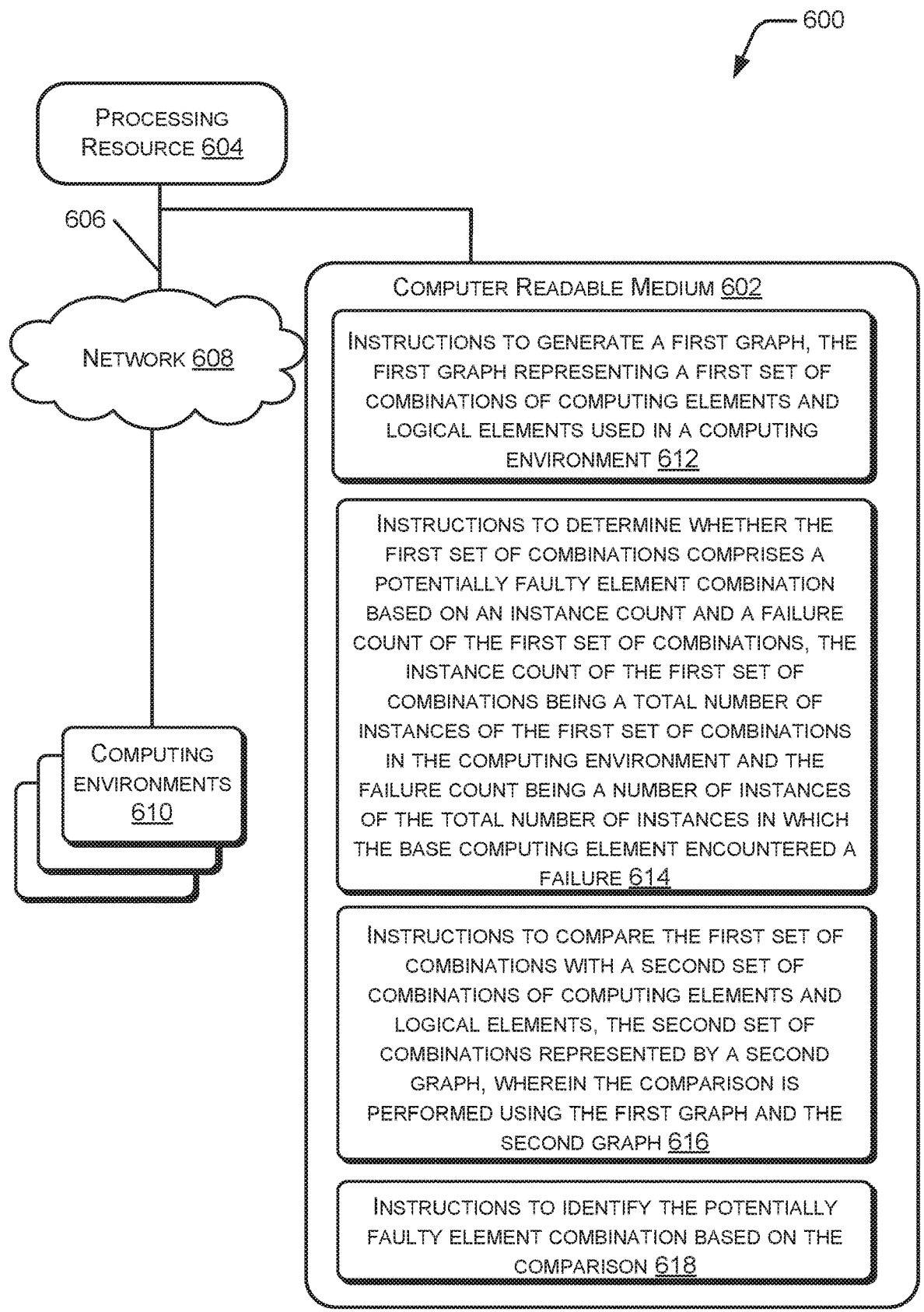
FIG. 6 illustrates a computing environment, implementing a non-transitory computer-readable medium for identification of cause of failure of computing elements in a computing environment, according to an example implementation of the present subject matter.

FIG. 6 illustrates a computing environment 600, implementing a non-transitory computer-readable medium 602 for identification of cause of failure of computing elements in a computing environment, according to an example implementation of the present subject matter.

In an example, the non-transitory computer-readable medium 602 may be utilized by a system, such as the system 100. The system 100 may be implemented in a public networking environment or a private networking environment. In an example, the computing environment 600 may include a processing resource 604 communicatively coupled to the non-transitory computer-readable medium 602 through a communication link 606.

In an example, the processing resource 604 may be implemented in a system, such as the system 100. The processing resource 604 may be the processor 102. The non-transitory computer-readable medium 602 may be, for example, an internal memory device or an external memory device. In one implementation, the communication link 606 may be a direct communication link, such as any memory read/write interface. In another implementation, the communication link 606 may be an indirect communication link, such as a network interface. In such a case, the processing resource 604 may access the non-transitory computer-readable medium 602 through a network 608. The network 608 may be a single network or a combination of multiple networks and may use a variety of different communication protocols.

The processing resource 604 and the non-transitory computer-readable medium 602 may also be communicatively coupled to computing environments 610 over the network 608. The computing environments 610 may be, for example, data centers.

In an example implementation, the non-transitory computer-readable medium 602 includes a set of computer-readable instructions to identify element combinations that cause failures of computing elements. The set of computer-readable instructions can be accessed by the processing resource 604 through the communication link 606 and subsequently executed to perform acts to identify element combinations that cause failures of computing elements.

Referring to FIG. 6, in an example, the non-transitory computer-readable medium 602 includes instructions 612 that cause the processing resource 604 to generate a first graph. The first graph represents a first set of combinations of computing elements and logical elements used in a computing environment, such as a data center. The first graph may be, for example, the first graph 222. In an example, the first graph includes a base node representing a base computing element, such as the first server 206, and a plurality of connected nodes connected to the base node. Each connected node represents one of a plurality of connected elements connected to the base computing element.

Each connected element may be one of a base logical element, such as the first BIOS 214, an auxiliary logical element, such as the first network adapter firmware 216, first BMC firmware 218, and first FMM firmware 220, and an auxiliary computing element. Also, connections between the base computing element and the plurality of connected elements may form the first set of combinations. Further, the first set of combinations includes a plurality of element combinations, each including a connection between the base computing element and a connected element.

The non-transitory computer-readable medium 602 includes instructions 614 that cause determination as to whether the first set of combinations includes a potentially faulty element combination. The determination may be performed based on an instance count and a failure count of the first set of combinations. The instance count is a total number of instances of the first set of combinations in the computing environment and the failure count is a number of instances of the total number of instances in which the base computing element encountered a failure. In an example, based on the instance count and the failure count, a risk score may be computed, as explained with reference to equation (1). Further, the first set of combinations may be determined as including a potentially faulty element combination if the risk score is greater than a threshold value.

In an example, the determination may be performed based on a second instance count and a second failure count of the first set of combinations. The second instance count is a total number of instances of the first set of combinations in a second computing environment, and the second failure count is a number of instances among the total number of instances in which the base computing element encountered a failure. In an example, based on the second instance count and the second failure count, the risk score may be computed, as explained with reference to equation (2).

The non-transitory computer-readable medium 602 includes instructions 616 that cause comparison of the first set of combinations with a second set of combinations of computing elements and logical elements, hereinafter referred to as the second set of combinations. The second set of combinations is represented by a second graph, such as the second graph 312. The comparison of the first set of combinations and the second set of combinations may be achieved using the first graph and the second graph. For example, first set of node combinations formed from the first graph and second set of node combinations formed from the second graph may be compared, as explained earlier.

In addition to the second set of combinations, the instructions 616 may cause comparison of the first set of combinations with other sets of combinations as well, such as the third set of combinations, as explained earlier.

Further, the non-transitory computer-readable medium 602 includes instructions 618 that cause identification of the potentially faulty element combination based on the comparison. For the identification, the instructions 618 may utilize the risk score of the second set of combinations and risk score of any other sets of combinations that were compared, as explained above.

In an example, the non-transitory computer-readable medium 602 includes instructions that cause computation of revised risk score of the first set of combinations. For this, the instructions may cause detection of a failure of the base computing element in an instance of the first set of combinations in the computing environment. For example, it may be detected that the first server 206 in the first set of combinations in one location of the data center 204 has failed. Subsequently, the failure count of the first set of combinations is incremented and the revised risk score is computed.

In an example, the non-transitory computer-readable medium 602 includes instructions that cause receiving a super-graph representing the computing environment. Further, the instructions cause the division of the super-graph into a plurality of preliminary graphs, each having a base node and a plurality of connected nodes. Subsequently, the instructions cause comparison of each preliminary graph with other preliminary graphs of the plurality of preliminary graphs to identify redundant preliminary graphs. Thereafter, the instructions cause removal of redundant preliminary graphs to obtain a plurality of graphs. The plurality of graphs forms the set of graphs that are stored in a global knowledge repository (GKR), as explained earlier.

Using the present subject matter, a computing environment may be represented in the form of a plurality of graphs. Such graphs represent combinations of elements used in the computing environment. By comparing combinations of elements represented by one graph with combinations of elements represented by another graph, potentially faulty combinations, i.e., element combinations that may cause failure of computing elements can be identified. Therefore, it can be ensured that potentially faulty combinations are not deployed in computing environments.

Although implementations of identification of cause of failure of computing elements in a computing environment have been described in language specific to structural features and/or methods, it is to be understood that the present subject matter is not necessarily limited to the specific features or methods described. Rather, the specific features and methods are disclosed and explained as example implementations.

We claim:

1. A system comprising:
a processor; and
a memory coupled to the processor and storing instructions executable by the processor to:
receive a first graph, the first graph representing a first set of combinations of computing elements and logical elements used in a first computing environment and the first graph comprising:
a base node representing a base computing element; and
a plurality of connected nodes connected to the base node, each connected node representing one of a plurality of connected elements connected to the base computing element, wherein
connections between the base computing element and the plurality of connected elements form the first set of combinations,
each element combination of the first set of combinations comprises a connection between the base computing element and a connected element, and
the first graph is received in response to a determination that the first set of combinations has a potentially faulty element combination that is likely to cause failure of the base computing element;
compare the first set of combinations with a second set of combinations of computing elements and logical elements, wherein the second set of combinations is represented by a second graph and is determined as having no potentially faulty combination, and wherein the comparison is performed using the first graph and the second graph; and
identify the potentially faulty element combination based on the comparison.

2. The system of claim 1, wherein the first computing environment is a first data center.

3. The system of claim 1, wherein each connected element is one of: a base logical element installed on the base computing element and an auxiliary logical element installed on an auxiliary computing element that is connected to the base computing element.

4. The system of claim 3, wherein the base computing element and the auxiliary computing element are tangible elements, and wherein each tangible element is one of:
a server, an interconnect, a network adapter, and a switch.

5. The system of claim 3, wherein
the first graph further comprises an auxiliary computing node representing the auxiliary computing element; and
an element combination that comprises a connection between the base computing element and the auxiliary logical element comprises:
a first sub-connection between the base computing element and the auxiliary computing element; and
a second sub-connection between the auxiliary computing element and the auxiliary logical element.

6. The system of claim 3, wherein the second set of combinations has the same base computing element as the first set of combinations.

7. The system of claim 1, wherein the instructions are executable by the processor to:
compute a risk score of the first set of combinations based on a first instance count and a first failure count of the first set of combinations, the first instance count of the first set of combinations being a total number of instances of the first set of combinations in the first computing environment and the first failure count of the first set of combinations being a number of instances among the total number of instances in which the base computing element encountered a failure; and
determine that the first graph has a potentially faulty element combination in response to the risk score of the first set of combinations being greater than a threshold value.

8. The system of claim 7, wherein the first set of combinations is present in a second computing environment, and the instructions are executable by the processor to:
compute a second instance count of the first set of combinations, the second instance count being a total number of instances of the first set of combinations in the second computing environment;
compute a second failure count of the first set of combinations, the second failure count being a number of instances among the total number of instances in which the base computing element encountered a failure; and
compute the risk score of the first set of combinations based on the second instance count and the second failure count.

9. The system of claim 7, wherein the instructions are executable by the processor to compute a fault score of the potentially faulty element combination based on the risk score of each of a plurality of sets of combinations that comprise the potentially faulty element combination.

10. The system of claim 1, wherein the instructions are executable by the processor to identify an element combination of the first set of combinations that is absent in the second set of combinations as the potentially faulty element combination.

11. The system of claim 1, wherein the instructions are executable by the processor to:

store a node combination corresponding to the potentially faulty element combination in a consolidated knowledge repository (CKR) that is to store potentially faulty node combinations;

receive an input node combination representing an input element combination that is to be deployed in one of: the first computing environment, a second computing environment, and a third computing environment; and compare the input node combination with each node combination in the CKR to determine whether the input node combination represents a potentially faulty element combination.

12. A method comprising:

obtaining, by a processing resource, a first graph representing a first set of combinations of computing elements and logical elements used in a computing environment, the first graph comprising:

a base node representing a base computing element; and a plurality of connected nodes connected to the base node, each connected node representing one of a plurality of connected elements connected to the base computing element, wherein connections between the base computing element and the plurality of connected elements form the first set of combinations, and the first set of combinations comprises a plurality of element combinations, each element combination comprising a connection between the base computing element and a connected element;

computing, by the processing resource, a risk score of the first set of combinations based on an instance count and a failure count of the first set of combinations, the instance count of the first graph being a total number of instances of the first set of combinations in the computing environment and the failure count being a number of instances of the total number of instances in which the base computing element encountered a failure; and in response to the risk score of the first set of combinations exceeding a threshold value, comparing, by the processing resource, the first set of combinations with a second set of combinations of computing elements and logical elements represented by a second graph, the comparing being performed using the first graph and the second graph, for identifying an element combination of the first set of combinations that is a likely cause for the risk score exceeding the threshold value.

13. The method of claim 12, comprising, prior to comparing the first set of combinations with the second set of combinations, comparing, by the processing resource using a machine learning technique, the first set of combinations with a plurality of sets of combinations, each of the plurality of sets of combinations represented by a graph of a set of graphs, for identifying a set of combinations that is different from the first set of combinations by one element combination.

14. The method of claim 12, comprising identifying the element combination of the first set of combinations that is a likely cause for the risk score exceeding the threshold value based on the comparison and on the risk score of the second graph.

15. The method of claim 12, comprising:

storing a node combination corresponding to the identified element combination in a consolidated knowledge repository (CKR) that is to store potentially faulty node combinations;

receiving an input node combination representing an input element combination that is to be deployed in one of: the computing environment, a second computing environment, and a third computing environment; and comparing the input node combination with each node combination in the CKR to determine whether the input node combination represents a potentially faulty element combination.

16. The method of claim 12, wherein comparing the first set of combinations with the second set of combinations using the first graph and second graph comprises comparing a first set of node combinations with a second set of node combinations, the first set of node combinations formed from the first graph and representing the first set of combinations, and the second set of node combinations formed from the second graph and representing the second set of combinations.

17. A non-transitory computer-readable medium comprising instructions for identification of cause of failure of computing elements in a computing environment, the instructions being executable by a processing resource to:

generate a first graph representing a first set of combinations of computing elements and logical elements used in a computing environment, the first graph including a base node representing a base computing element and a plurality of connected nodes connected to the base node;

determine whether the first set of combinations comprises a potentially faulty element combination based on an instance count and a failure count of the first set of combinations, the instance count of the first set of combinations being a total number of instances of the first set of combinations in the computing environment and the failure count being a number of instances of the total number of instances in which the base computing element encountered a failure;

compare the first set of combinations with a second set of combinations of computing elements and logical elements, the second set of combinations represented by a second graph, wherein the comparison is performed using the first graph and the second graph; and identify the potentially faulty element combination based on the comparison.

18. The non-transitory computer-readable medium of claim 17, wherein the first graph further comprises:

each connected node representing one of a plurality of connected elements connected to the base computing element, wherein each connected element is one of an auxiliary computing element, a base logical element, and an auxiliary logical element, connections between the base computing element and the plurality of connected elements form the first set of combinations, and each element combination of the first set of combinations comprises a connection between the base computing element and a connected element.

19. The non-transitory computer-readable medium of claim 17, wherein, based on the instance count and failure count, the instructions are executable by the processing resource to compute a risk score of the first set of combinations, and subsequent to the computation of the risk score of the first set of combinations, the instructions are executable by the processing resource to:

detect a failure of the base computing element in an instance of the first set of combinations in the computing environment;

increment the failure count of the first set of combinations; and compute a revised risk score of the first set of combinations.

20. The non-transitory computer-readable medium of claim 17, wherein the instructions are executable by the processing resource to:

receive a super-graph representing the computing environment; and divide the super-graph into a plurality of preliminary graphs, each having a base node and a plurality of connected nodes;

compare each preliminary graph with other preliminary graphs of the plurality of preliminary graphs to identify redundant preliminary graphs; and remove redundant preliminary graphs to obtain a plurality of graphs.

\* \* \* \* \*